(12) United States Patent
Seal et al.

(10) Patent No.: US 9,383,999 B2
(45) Date of Patent: Jul. 5, 2016

(54) CONDITIONAL COMPARE INSTRUCTION

(75) Inventors: David James Seal, Cambridge (GB); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 634 days.

(21) Appl. No.: 13/637,757

(22) PCT Filed: Apr. 12, 2011

(86) PCT No.: PCT/GB2011/050719
§ 371 (c)(1),
(2), (4) Date: Nov. 21, 2012

(87) PCT Pub. No.: WO2011/141726
PCT Pub. Date: Nov. 17, 2011

(65) Prior Publication Data
US 2013/0097408 A1    Apr. 18, 2013

(30) Foreign Application Priority Data

May 11, 2010  (GB) .................................. 1007890.5
Oct. 12, 2010  (GB) .................................. 1017144.5

(51) Int. Cl.
*G06F 7/38* (2006.01)
*G06F 9/00* (2006.01)
*G06F 9/30* (2006.01)

(52) U.S. Cl.
CPC ........ *G06F 9/30145* (2013.01); *G06F 9/30021* (2013.01); *G06F 9/30072* (2013.01); *G06F 9/30167* (2013.01)

(58) Field of Classification Search
CPC .......................... G06F 9/30072; G06F 9/30029
See application file for complete search history.

(56) References Cited

U.S. PATENT DOCUMENTS 5,371,862 A    12/1994  Suzuki et al.
5,471,593 A *  11/1995  Branigin ............. G06F 9/30018
                                                712/219

(Continued)

FOREIGN PATENT DOCUMENTS

CN    1497435      5/2004
CN    101320324    12/2008

(Continued)

OTHER PUBLICATIONS

English translation of Japanese Office Action issued Jun. 23, 2014 in JP 2013-509616, 7 pages.

(Continued)

*Primary Examiner* — Hyun Nam
(74) *Attorney, Agent, or Firm* — Nixon & Vanderhye P.C.

(57) ABSTRACT

An instruction decoder (14) is responsive to a conditional compare instruction to generate control signals for controlling processing circuitry (4) to perform a conditional compare operation. The conditional compare operation comprises: (i) if a current condition state of the processing circuitry (4) passes a test condition, then performing a compare operation on a first operand and a second operand and setting the current condition state to a result condition state generated during the compare operation; and (ii) if the current condition state fails the test condition, then setting the current condition state to a fail condition state specified by the conditional compare instruction. The conditional compare instruction can be used to represent chained sequences of comparison operations where each individual comparison operation may test a different kind of relation between a pair of operands.

19 Claims, 11 Drawing Sheets

(56) References Cited

U.S. PATENT DOCUMENTS

| | | | | |
|---|---|---|---|---|
| 5,542,027 | A * | 7/1996 | Thornber | G06N 7/043 706/1 |
| 5,790,854 | A | 8/1998 | Spielman et al. | |
| 5,832,258 | A | 11/1998 | Kiuchi et al. | |
| 6,009,512 | A | 12/1999 | Christie | |
| 6,505,345 | B1 | 1/2003 | Chen et al. | |
| 6,516,407 | B1 | 2/2003 | Suga et al. | |
| 6,704,853 | B1 * | 3/2004 | Imamura | G06F 9/3001 709/216 |
| 6,732,356 | B1 | 5/2004 | Chen | |
| 7,581,088 | B1 | 8/2009 | Metzgen | |
| 8,078,846 | B2 * | 12/2011 | Kishore et al. | 712/219 |
| 2004/0006687 | A1 * | 1/2004 | Yoshida | G06F 9/30094 712/220 |
| 2006/0095733 | A1 * | 5/2006 | Lee et al. | 712/217 |
| 2006/0236078 | A1 | 10/2006 | Sartorius et al. | |
| 2008/0141229 | A1 | 6/2008 | Heishi et al. | |
| 2010/0023734 | A1 | 1/2010 | Dayan et al. | |
| 2010/0257338 | A1 * | 10/2010 | Spracklen | G06F 9/30101 712/208 |
| 2012/0079245 | A1 * | 3/2012 | Wang | G06F 9/30072 712/208 |
| 2012/0079246 | A1 * | 3/2012 | Breternitz, Jr. | G06F 9/30072 712/208 |
| 2014/0281389 | A1 * | 9/2014 | Loktyukhin | G06F 9/30196 712/206 |

FOREIGN PATENT DOCUMENTS

| | | |
|---|---|---|
| CN | 101593096 | 12/2009 |
| EP | 1372064 | 6/2005 |
| JP | H07-73149 | 3/1995 |
| JP | 11-296368 | 10/1999 |
| JP | 2001-265592 | 9/2001 |
| JP | 2006-209805 | 8/2006 |
| JP | 2007-272353 | 10/2007 |
| JP | 2008-537231 | 9/2008 |
| TW | 569136 | 1/2004 |
| WO | WO 2006/113420 | 10/2006 |

OTHER PUBLICATIONS

Israeli Office Action dated Aug. 4, 2014 in IL 222551 and English translation, 3 pages.
International Search Report for PCT/GB2011/050719 mailed Feb. 24, 2012.
Search Report for GB 1007890.5 dated Sep. 2, 2010.
Search Report for GB 1017144.5 dated Feb. 11, 2011.
Office Action issued Mar. 19, 2015 in corresponding Israeli application and partial English translation, 3 pages.
English translation of Chinese First Office Action dated Jul. 18, 2014 in CN 201180023699.8, 12 pages.
International Preliminary Report on Patentability issued Nov. 13, 2012 in PCT/GB2011/050719.
UK Examination Report issued May 21, 2013 in GB1017144.5.
Taiwanese Office Action and Search Report dated Jan. 23, 2015 in TW 100113216 and English translation, 17 pages.
English translation of Chinese Second Office Action dated Mar. 17, 2015 in CN 201180023699.8, 4 pages.

* cited by examiner

CCMP   Cond, Rn, Rm, #imm
Cond → test condition
Rn, Rm → operands
imm → fail condition state
FIG. 3A
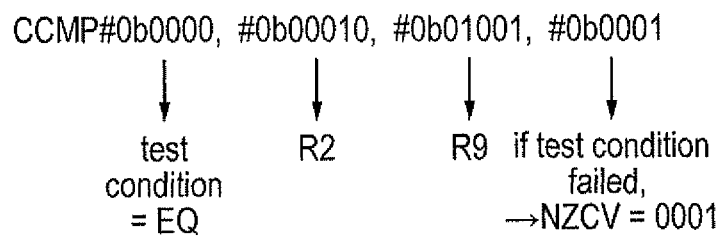
FIG. 3B
CCMP   Cond, Rn, #op, #imm
Cond → test condition
Rn, #op → operands
imm → fail condition state
FIG. 4A
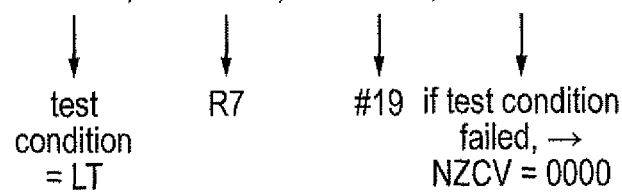
FIG. 4B CCMP cond, Rn, Rm, #imm if cond passed, perform (Rn-Rm) and write result condition state to flags if cond failed, write #imm to flags

FIG. 6A

CCMN cond, Rn, Rm, #imm if cond passed, perform (Rn+Rm) and write result condition state to flags if cond failed, write #imm to flags

FIG. 6B

CTEQ cond, Rn, Rm, #imm if cond passed, perform (Rn EOR Rm) and write result condition state to flags if cond failed, write #imm to flags

FIG. 6C

CTST cond, Rn, Rm, #imm if cond passed, perform (Rn AND Rm) and write result condition state to flags if cond failed, write #imm to flags

FIG. 6D

CADC cond, Rn, Rm, #imm if cond passed, perform (Rn + Rm + C) and write result condition state to flags if cond failed, write #imm to flags

FIG. 6E

CORRT cond, Rn, Rm, #imm if cond passed, perform (Rn OR Rm) and write result condition state to flags if cond failed, write #imm to flags

FIG. 6F

| Suffix | Flags | Meaning |
| --- | --- | --- |
| EQ | z set | Equal |
| NE | z clear | Not equal |
| CS/HS | c set | Higher or same (unsigned >= ) |
| CC/LO | c clear | Lower (unsigned < ) |
| MI | N set | Negative |
| PL | N clear | Positive or zero |
| VS | v set | Overflow |
| VC | v clear | No overflow |
| HI | c set and z clear | Higher (unsigned <= ) |
| LS | c clear or z set | Lower or same (unsigned <= ) |
| GE | N and v the same | Signed >= |
| LT | N and v different | Signed < |
| GT | z clear, and N and v the same | Signed > |
| LE | z set, or N and v different | Signed <= |
| AL | Any | Always (usually omitted) |

FIG. 8

| Suffix | Flags | Meaning |
| --- | --- | --- |
| EQ | z set | Equal |
| NE | z clear | Not equal |
| CS/HS | c set | Higher or same (unsigned >= ) |
| CC/LO | c clear | Lower (unsigned < ) |
| MI | N set | Negative |
| PL | N clear | Positive or zero |
| VS | v set | Overflow |
| VC | v clear | No overflow |
| HI | c set and z clear | Higher (unsigned <= ) |
| LS | c clear or z set | Lower or same (unsigned <= ) |
| GE | N and v the same | Signed >= |
| LT | N and v different | Signed < |
| GT | z clear, and N and v the same | Signed > |
| LE | z set, or N and v different | Signed <= |
| MZ | N and Z set | Minus zero |
| OK | N or Z clear | Not minus zero |

— exclusive to conditional compare instructions

FIG. 10

| | X < BOT | BOT ≤ X < TOP | TOP ≤ X |
|---|---|---|---|
| CMP X, TOP | LT | LT | GE |
| CCMP LT, X, BOT, MZ | pass test → LT | pass test → GE | fail test → MZ |
| CSEL MZ, X, TOP, X | fail test → X stays same | fail test → X stays same | pass test → X = TOP |
| CSEL LT, X, BOT, X | pass test → X = BOT | fail test → X stays same | fail test → X stays same |
| | ↓ | ↓ | ↓ |
| | X = BOT | X = X | X = TOP |

CONDITIONAL COMPARE INSTRUCTION

This application is the U.S. national phase of International Application No. PCT/GB2011/050719 filed 12 Apr. 2011 which designated the U.S. and claims priority to GB 1007890.5 filed 11 May 2010, and GB 1017144.5 filed 12 Oct. 2010, the entire contents of each of which are hereby incorporated by reference.

The present invention relates to the field of data processing. More particularly, the invention relates to a conditional compare instruction.

It is known to provide a processing apparatus with various condition flags for representing a current condition state of the processing apparatus. One example of such a data processing apparatus is the processors designed by ARM Limited of Cambridge, England, executing the ARM instruction set. Instructions may be arranged to execute conditionally so that the current state of the condition flags at the time of execution of the conditional instruction controls whether or not a conditional operation is performed. For example, for one type of conditional instruction the current condition state is tested on execution, and if the current condition state passes the test then the condition flags are updated according to the result of an operation performed upon two operands. If the current condition state fails the test then the instruction acts as a NOP instruction having no function, thus leaving the condition flags unchanged.

Such instructions can be used to implement some combinations of a test and a logical operation on the result of the test. For example, a logical expression of the form (A==B && C==D)||E==F, comprising an initial test A==B followed by a chain of further tests each of whose results is combined with the condition flags resulting from the previous operations using an AND (&&) or an OR (||) operation, can be evaluated using a sequence of instructions comprising an unconditional compare instruction and one or more conditional compare instructions, with each conditional compare instruction being arranged to update the condition flags only if the result of the previous instruction satisfies a particular condition.

For example, the expression (A==B && C==D)||E==F may be evaluated using the following sequence of instructions:

| CMP   | A, B |
| CMPEQ | C, D |
| CMPNE | E, F |

The unconditional compare instruction CMP A, B compares the values of A and B and sets the condition flags according to the result of the comparison. If A and B are equal, then the condition flags are placed in an EQ state, while if A and B are not equal, the condition flags are placed in a NE state.

On executing the conditional compare instruction CMPEQ C, D, if the condition flags are in the EQ state (i.e. the test A==B was satisfied) then the comparison between C and D is performed and the condition flags are updated according to the result of the comparison. Otherwise, when the condition flags are in the NE state (i.e. A==B was not satisfied), then the CMPEQ instruction behaves as a NOP and the condition flags are unchanged. This means that, following execution of the first two instructions, the condition flags will indicate the EQ state only if both A=B and C=D, and will indicate the NE state otherwise. This is the correct result for combining the tests A==B and C==D using an AND operation.

Next, the conditional compare instruction CMPNE E, F is executed, and if the condition flags are in the EQ state (i.e. the test A==B && C==D was satisfied), then the CMPNE instruction will be treated as a NOP, and so the condition codes will remain in the EQ state. Alternatively, if the condition flags are in the NE state (i.e. the test A==B && C==D was not satisfied), then the comparison of E and F is performed and the condition flags updated according to the result of the comparison. Hence, the final result will be EQ if either (A=B AND C=D) or E=F, and will be NE only if neither of these tests are satisfied. This is the correct result for combining the tests (A==B && C==D) and E==F with an OR operation.

Hence, the conditional compare instructions CMPEQ and CMPNE can be used to evaluate chains of tests of the form (A==B && C==D)||E==F. However, these kinds of instructions can only be used when all the individual tests within the chain evaluate either the same kind of relation, or different kinds of relation that can be transformed into the same kind of relation. For example, in the previous example, all the individual tests evaluate an "equals" relation. Alternatively, the conditional instructions could be used to represent a logical condition of the form (A>B && C<D) because the relation C<D can be transformed into D>C which is the same kind of relation as A>B. However, it is not possible to test logical expressions such as (A>B||C==D) && E<=F, or A==B && C!=D, for example, because the relations being tested are different and cannot be transformed into one another.

Therefore, these conditional instructions can only be used for testing certain kinds of logical expressions. This means that the amount of source code that can be compiled using such instructions is limited, and it is complex for a compiler to determine whether or not the conditional instructions can be used for a particular application.

Viewed from a first aspect the present invention provides a data processing apparatus comprising:

processing circuitry for processing data;

an instruction decoder responsive to program instructions to generate control signals for controlling said processing circuitry to process said data;

a status store for storing a current condition state of said processing circuitry, said current condition state being modifiable during processing of said data;

wherein said program instructions include a conditional compare instruction, and said instruction decoder is responsive to said conditional compare instruction to generate control signals for controlling said processing circuitry to perform a conditional compare operation comprising:

(i) if said current condition state passes a test condition, then performing a compare operation on a first operand and a second operand and setting said current condition state to a result condition state generated during said compare operation; and (ii) if said current condition state fails said test condition, then setting said current condition state to a fail condition state specified by said conditional compare instruction.

The present technique provides a conditional compare instruction which controls processing circuitry to determine whether a current condition state of the processing circuitry passes a test condition. Independently of whether the current condition state passes or fails the test condition, the current condition state is updated. The new value for the current condition state is determined in different ways depending on whether the current condition state passed or failed the test condition. If the current condition state passed the test condition, then a compare operation is performed on a first operand and a second operand and the current condition state is set to a result condition state generated during the compare operation. On the other hand, if the current condition state fails the test condition, then the current condition state is set to a fail condition state specified by the conditional compare instruction.

The ability to specify a particular fail condition state value, which replaces the current condition state if the current condition state fails the test condition, enables the conditional compare instruction to be used to test a chained sequence of comparisons of different types. This is because for a conditional compare instruction corresponding to one comparison in the chain, the fail condition state can be used to set up the particular condition state required to test the next comparison in the chain. Hence, the conditional compare instruction can be used even when the relations within the chained sequence cannot be transformed into the same kind of relation. For example, a sequence of the form ((S==T && U>=0)||A!=B) && C>D can be tested even though the individual relations ==, >=, > being tested are different and cannot be transformed into one another. This means that the conditional compare instruction can be used more widely than previously known conditional compare instructions and hence are more easily usable by compilers.

The status store may be any kind of storage location for storing the current condition state. In one example embodiment, the status store may comprise a status register.

The current condition state of the apparatus may comprise a value of at least one condition code flag stored within the status store. For example, condition code flags may be provided to indicate whether a previous comparison resulted in a negative value, a zero value, a carry, or an overflow. A later comparison can then be made conditional on the values of the condition flags so that the result of the later comparison is dependent on both the earlier comparison and the later comparison. This enables the earlier and later comparisons to be chained together to form a combined logical condition.

The conditional compare instruction may include a field for specifying the test condition. The test condition could be specified either directly by a programmer of a program including the conditional compare instruction, or could be generated automatically by a compiler when the conditional compare instruction is part of a sequence of program instructions representing a desired logical expression.

The fail condition state may be specified by the conditional compare instruction as an immediate value. Thus, the immediate value indicates the value to be set to the current condition state if the current condition state at the time of execution of the conditional compare instruction fails the test condition.

The immediate value representing the fail condition state may be a programmable value set by the programmer of a program comprising the conditional compare instruction. This provides the programmer with direct control over the fail condition state.

Also, the immediate value representing the fail condition state may be a programmable value set by a compiler of a program comprising the conditional compare instruction, the compiler selecting the programmable value in dependence on a desired condition that the fail condition state for the conditional compare instruction should subsequently pass. In this case, the compiler can determine what the desired condition is and convert it into the programmable value to be written to the current condition state if the test condition is failed. For example, if the desired condition is an EQ condition, then the compiler can select a programmable value which, when written to the condition flags in the event that the test condition is failed, causes the EQ condition to be satisfied. Where multiple possible programmable values each satisfy the desired condition, then the compiler may be arranged to apply a selection criterion for selecting which programmable value is used, to ensure that a particular source code is compiled in the same way every time by the compiler. For example, the compiler can select the largest or smallest possible value satisfying the desired condition, or apply any other rule for selecting one value for use as the fail condition state value.

The fail condition state value may be specified as an N-bit fail condition state value, where N is any integer greater than zero, and the current condition state may be represented by an N-bit value. The instruction decoder may control the processing circuitry to write the N-bit fail condition state value to the status store if the current condition state fails the test condition. The fail condition state and the current condition state may be encoded in the same way so that the particular bits of the fail condition state value can simply be written to the status store in order to update the current condition state when the current condition state fails the test condition.

In one example embodiment, the current condition state may be settable to any of a plurality of condition states including a predetermined condition state, and the current condition state may only be set to the predetermined condition state if the test condition is failed for a conditional compare instruction specifying the predetermined condition state as the fail condition state.

When a conditional compare instruction fails its test condition, then the current condition state is set to a fail condition state specified in the instruction.

When the conditional compare instruction passes its test condition, then a compare operation is performed and the current condition state is updated according to a result of the compare operation. As the updated condition state resulting from the compare operation may be the same as the fail condition state, then it may not be possible to determine accurately whether or not the test condition was passed or failed.

Therefore, in one example embodiment, a predetermined condition state may be provided which cannot arise from normal processing operations. The predetermined condition state is exclusive to conditional compare instructions, so that the processing circuitry can only be placed in the predetermined condition state if a conditional compare instruction specifying the predetermined condition state as its fail condition state fails its test condition. Hence, it is possible to determine whether or not a conditional compare instruction specifying the predetermined condition state as the fail condition passed or failed its test condition, by testing whether or not the predetermined condition state has arisen following execution of the conditional compare instruction. This can be useful, for example, for testing whether a particular data value is within a given range of data values.

The conditional compare instruction may include first and second operand fields for specifying the first operand and the second operand. At least one of the first and second operand fields may specify a storage location storing the first operand or the second operand. By specifying the number of a storage location (e.g. a register) for storing the operand, the operand field can be used to identify operands having a larger number of bits than the number of bits available for the operand field within the instruction encoding. Moreover, referencing a storage location in the operand field allows variable operands that differ between multiple executions of the same instruction to be specified.

The instruction decoder may be configured to be responsive to one of the operand fields specifying a predetermined combination of bit values to control the processing circuitry to perform the conditional compare operation with a corresponding one of the first and second operands having a value of zero. For example, an all-ones bit value (e.g. 0b11111) can be used as the predetermined combination of bits for indicating a zero operand. Hence, the predetermined combination of bit values is not interpreted as a storage location specifier by the instruction decoder, but is instead used to identify a value of zero. This is useful because comparisons with a zero value are common and so the ability to encode such a comparison directly in the instruction syntax means that the need to access a storage location to obtain a zero operand can often be avoided.

One of the first and second operand fields may specify an immediate value as the first operand or the second operand. This form of the instruction can be useful for a comparison between a variable value and a fixed value. In this case, one of the operand fields can be used to specify a storage location storing the variable operand, and the other operand field can be used to specify an immediate value representing the fixed value.

The compare operation performed by the processing circuitry if the test condition of the conditional compare instruction is satisfied may have various forms. For example, the compare operation may comprise any one of:

(a) subtracting said second operand from said first operand;
(b) adding said first operand to said second operand;
(c) performing a bitwise exclusive OR operation on said first operand and said second operand;
(d) performing a bitwise AND operation on said first operand and said second operand;
(e) adding said first operand, said second operand, and a carry bit of said status store; and
(f) performing a bitwise OR operation on said first operand and said second operand.

The compare operation may also comprise another arithmetic or logical operation that is performed on the first and second operands.

Viewed from another aspect, the present invention provides a data processing apparatus comprising:

processing means for processing data;
an instruction decoder means for generating control signals in response to program instructions, said control signals being for controlling said processing means to process said data;
status storage means for storing a current condition state of said processing means, said current condition state being modifiable during processing of said data;
wherein said program instructions include a conditional compare instruction, and said instruction decoder means is responsive to said conditional compare instruction to generate control signals for controlling said processing means to perform a conditional compare operation comprising:
(i) if said current condition state passes a test condition, then performing a compare operation on a first operand and a second operand and setting said current condition state to a result condition state generated during said compare operation; and
(ii) if said current condition state fails said test condition, then setting said current condition state to a fail condition state specified by said conditional compare instruction.

Viewed from a further aspect, the present invention provides a data processing method comprising the steps of:

in response to program instructions including a conditional compare instruction, generating control signals for controlling processing circuitry to process data;
storing a current condition state of said processing circuitry, said current condition state being modifiable during processing of said data;
in response to said conditional compare instruction, generating control signals for controlling said processing circuitry to perform a conditional compare operation comprising:
(i) if said current condition state passes a test condition, then performing a compare operation on a first operand and a second operand and setting said current condition state to a result condition state generated during said compare operation; and
(ii) if said current condition state fails said test condition, then setting said current condition state to a fail condition state specified by said conditional compare instruction.

Viewed from yet another aspect, the present invention provides a method of compiling a sequence of program instructions for execution by a data processing apparatus, the sequence of program instructions including an unconditional compare instruction for controlling said data processing apparatus to perform an unconditional compare operation on two operands and set a current condition state of said data processing apparatus to a result condition state generated during said unconditional compare operation, and at least one conditional compare instruction for controlling said data processing apparatus to perform a conditional compare operation comprising: (i) if said current condition state of said data processing apparatus passes a test condition, then performing a compare operation on a first operand and a second operand and setting said current condition state to a result condition state generated during said compare operation; and (ii) if said current condition state fails said test condition, then setting said current condition state to a fail condition state specified by said conditional compare instruction; said method comprising the steps of (a) receiving input of data defining a chained sequence of N comparison operations logically combined using one or more AND or OR operations, where N is an integer greater than 1, each of said N comparison operations testing whether respective operands satisfy a respective predetermined criterion;
(b) generating a said unconditional compare instruction corresponding to the first comparison operation of said chained sequence;
(c) for each integer value of i between 2 and N, performing the steps of:
(i) determining whether an $i^{th}$ comparison operation of said chained sequence is logically combined with a result of a partial chained sequence using an AND operation or an OR operation, said partial chained sequence comprising the first to $(i-1)^{th}$ comparison operations of said chained sequence;
(ii) if said $i^{th}$ comparison operation is logically combined with said result of said partial chained sequence using an AND operation, generating a conditional compare instruction corresponding to said $i^{th}$ comparison operation, said conditional compare instruction specifying as said test condition a condition which is passed when said predetermined criterion of said $(i-1)^{th}$ comparison operation is satisfied and specifying as said fail condition state a condition state corresponding to said predetermined criterion of said $i^{th}$ comparison operation not being satisfied;
(iii) if said $i^{th}$ comparison operation is logically combined with said result of said partial chained sequence using an OR operation, generating a conditional compare instruction corresponding to said $i^{th}$ comparison operation, said conditional compare instruction specifying as said test condition a condition which is passed when said predetermined criterion of said $(i-1)^{th}$ comparison operation is not satisfied and specifying as said fail condition state a condition state corresponding to said predetermined criterion of said $i^{th}$ comparison operation being satisfied;

(d) outputting at least said unconditional compare instruction generated in step (b) and (N−1) said conditional compare instructions generated in step (c) as said sequence of program instructions.

The conditional compare instructions of the present technique may be used to represent a chained sequence of N comparison operations which are logically combined using one or more AND or OR operations. Each of the N comparison operations test whether respective operands satisfy a predetermined criterion. The conditional compare instruction of the present technique enables different criteria to be tested in each of the comparison operations. For example, one of the comparison operations can test whether one operand is greater than another operand, the next comparison operation may test whether one operand is equal to another operand, and a further comparison operation may test whether one operand is not equal to another operand.

Note that the term "criterion" is used to indicate the relation being tested by a particular comparison (e.g. A>B, or C==D), whereas the term "condition" indicates the test which controls whether or not the compare operation of a conditional comparison instruction is performed (e.g. a test to see whether the current condition state is the HI state, a test to see whether the Z flag is set to indicate that a previous result was zero, or a test to see whether the N flag is set to indicate that a previous result was negative).

A sequence of program instructions representing the chained sequence of N comparison operations may be built up step by step by generating compare instructions for each comparison operation (N is an integer greater than 1). Each comparison operation specifies a predetermined criterion (e.g. A<B) and is linked to the result of the partial chained sequence of previous comparison operations by an AND or an OR operation. For the first comparison operation in the chain sequence, an unconditional compare instruction is generated. For an $i^{th}$ comparison operation (i is any integer between 2 and N), a conditional compare instruction is generated, with the test condition and the fail condition state of the $i^{th}$ conditional compare instruction being dependent upon whether or not the $i^{th}$ comparison operation is logically combined with the result of the partial chained sequence comprising the first to $(i−1)^{th}$ comparison operations using an AND operation or an OR operation.

If the $i^{th}$ comparison operation is logically combined with the result of the partial chained sequence of previous comparison operations using an AND operation, then the $i^{th}$ conditional compare instruction specifies as the test condition a condition which is passed when the predetermined criterion of the $(i−1)^{th}$ comparison is satisfied, and specifies as the fail condition state a condition state corresponding to the predetermined criterion of the $i^{th}$ comparison operation not being satisfied. This ensures that if the $(i−1)^{th}$ predetermined criterion produces a "fail" result then the $i^{th}$ conditional compare instruction will fail its test condition and so return its own fail condition state, while if the $(i−1)^{th}$ predetermined criterion comparison operation produces a "pass" result then the $i^{th}$ comparison operation will pass its test condition and will produce a result condition state dependent on whether the $i^{th}$ predetermined criterion was satisfied. Thus, the combination of the $i^{th}$ and $(i−1)^{th}$ comparisons will only produce a pass result if both the $(i−1)^{th}$ and $i^{th}$ predetermined criteria are satisfied, which is the required behaviour for an AND operation.

On the other hand, if the $i^{th}$ comparison operation is logically combined with the result of the partial chained sequence using an OR operation, then a conditional compare instruction is generated corresponding to the $i^{th}$ comparison operation, the conditional compare instruction specifying as the test condition a condition which is passed when the predetermined criterion of the $(M)^{th}$ comparison operation is not satisfied and specifying as the fail condition state a condition state corresponding to the predetermined criterion of the $i^{th}$ comparison operation being satisfied. This ensures that if the $(i−1)^{th}$ predetermined criterion is satisfied, then the $i^{th}$ conditional compare instruction fails its test condition and so produces as its fail condition state the "pass" condition state corresponding to the $i^{th}$ predetermined criterion being satisfied. On the other hand, if the $(i−1)^{th}$ comparison does not satisfy its predetermined criterion, then the $i^{th}$ conditional compare instruction passes its test condition and so will produce a result condition state dependent on whether the $i^{th}$ predetermined criterion was satisfied. This means that the overall result will be the "pass" condition associated with the $i^{th}$ predetermined criterion as long as any one of the $(i−1)^{th}$ and $i^{th}$ predetermined criteria are satisfied. This is the required behaviour for an OR operation.

Hence, by generating a string of conditional compare instructions of this form, a chained sequence of comparisons can be converted into a sequence of program instructions. The generated sequence of instructions are then output.

It will be appreciated that the time order in which the unconditional compare instruction and the conditional compare instructions are generated is not important. For example, the instructions could be generated in the time order corresponding to the chained sequence of comparison operations (i.e. with the counter i being incremented from 2 to N). Alternatively, the instructions could be generated in the reverse time order of the chained sequence (with the counter being decremented from N to 2), or in any other time order. Regardless of the time order with which the instructions were generated, the program order of the generated instructions is the same, with the first instruction being the unconditional compare instruction corresponding to the first comparison operation in the chain, the second instruction being the conditional compare instruction corresponding to the second comparison operation in the chain, and so on.

A computer storage medium may be provided for storing a computer program which, when executed by a computer, controls the computer to perform the method of compiling a sequence of program instructions as described above.

Viewed from another aspect, the present invention provides a non-transitory computer storage medium storing a computer program comprising a conditional compare instruction for controlling processing circuitry to perform a conditional compare operation comprising:

(i) if a current condition state of said processing circuitry passes a test condition, then performing a compare operation on a first operand and a second operand and setting said current condition state to a result condition state generated during said compare operation; and (ii) if said current condition state fails said test condition, then setting said current condition state to a fail condition state specified by said conditional compare instruction.

Embodiments of the invention will now be described, by way of example only, with reference to the accompanying drawings in which:

FIG. 1 schematically illustrates a data processing apparatus;

FIG. 2 schematically illustrates an example of condition code flags;

FIGS. 3A and 3B respectively illustrate an example syntax and an example encoding of a conditional compare instruction comprising fields for specifying a test condition, two register operands and an immediate fail condition state value;

FIGS. 4A and 4B respectively illustrate an alternative example syntax and example encoding of a conditional compare instruction in which one of the operands is specified as an immediate value;

FIGS. 6A to 6F illustrate different types of conditional compare instruction each corresponding to a different compare operation;

FIG. 8 illustrates an example of various condition states and the combinations of condition flags representing each condition state;

Figure 9:
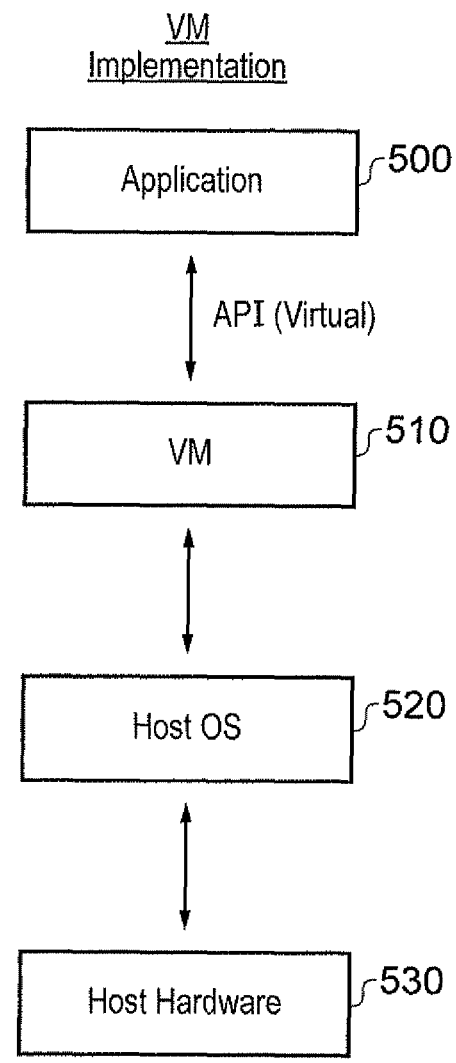
Figure 11:
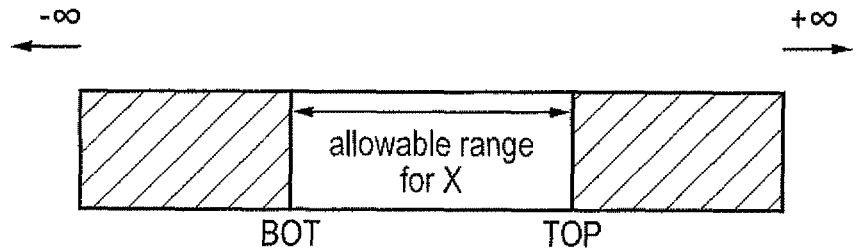

FIG. 9 schematically illustrates a virtual machine implementation;

FIG. 10 illustrates an example of condition states including a predetermined condition state which is for exclusive use by conditional compare instructions; and FIG. 11 illustrates an example of constraining a variable X to a given range of data values, using a conditional compare instruction specifying the predetermined condition state as its fail condition state.

Figure 1:
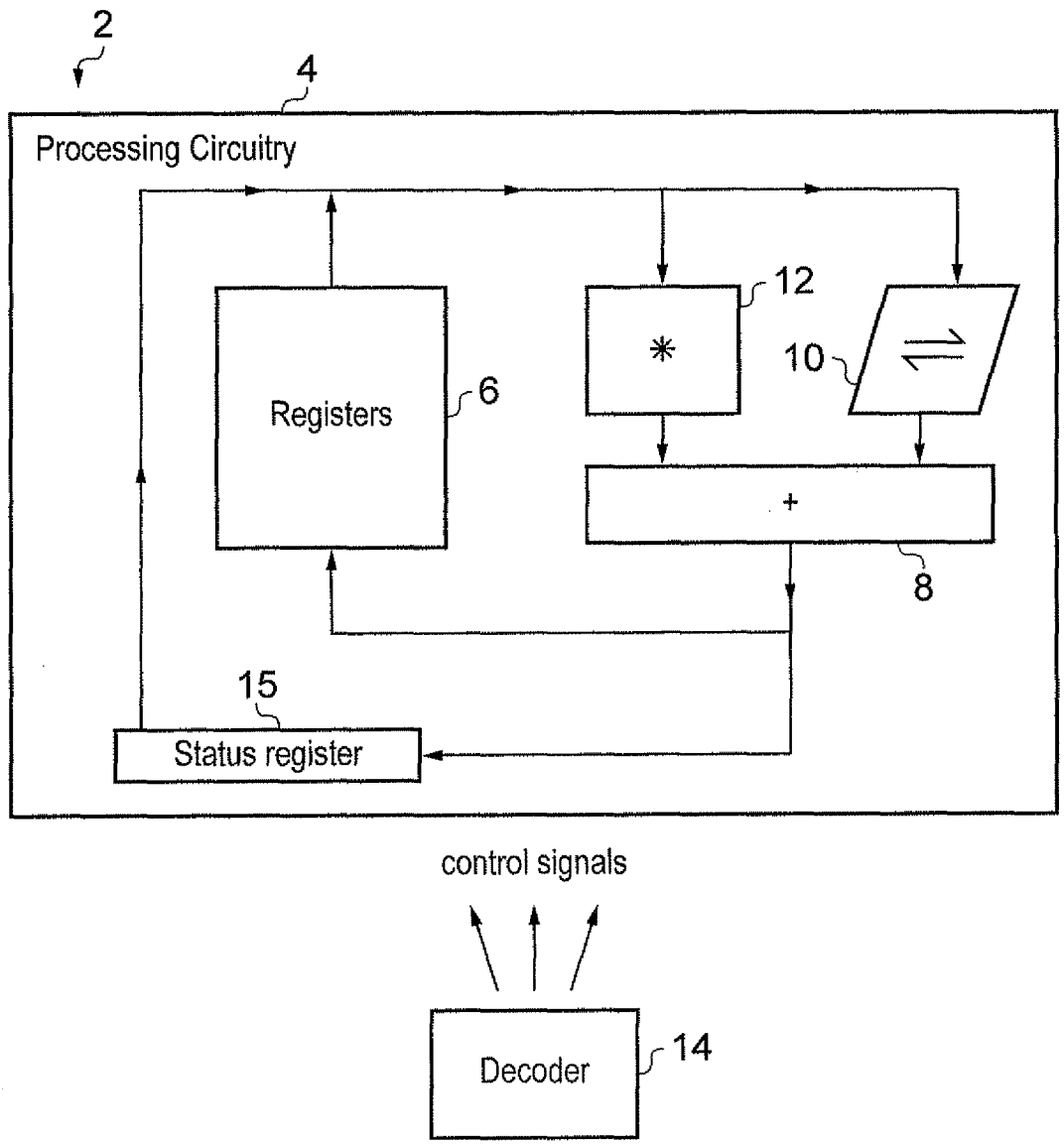

FIG. 1 illustrates a data processing apparatus 2. The apparatus 2 comprises processing circuitry 4 for processing data. The processing circuitry may comprise various components, for example a register bank 6, adder 8, shifter 10 and multiplier 12. The adder 8, shifter 10 and multiplier 12 collectively process data stored in the register bank 6 and write processing results back to the register bank 6. It will be appreciated that the processing circuitry 4 is not limited to this configuration and will typically comprise many other components which have not been illustrated for conciseness. The data processing apparatus 2 comprises a decoder 14 which is responsive to program instructions to generate control signals for controlling the processing circuitry 4 to process data.

The data processing apparatus 2 comprises a status store 15 for storing status data including at least a current condition state of the processing circuitry 4. In the example of FIG. 1, the status store 15 is a status register, but the storage location may also comprise other forms of storage location. While in FIG. 1 the status register 15 has been illustrated within the processing circuitry 4, in other embodiments, the status register 15 may be located in another part of the apparatus 2. In one embodiment, the current condition state is indicated by a set of condition code flags stored within the status register 15. The condition code flags indicate the condition of a previous processing result generated by the processing circuitry 4.

Figure 2:
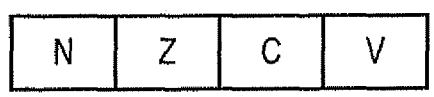

In the example embodiment illustrated in FIG. 2, the condition code flags of the status register 15 include a Negative flag N for indicating whether or not the previous processing result was a negative number, a Zero flag Z for indicating whether or not the previous processing result was zero, a Carry flag C for indicating whether or not a carry occurred when the previous processing result was generated, and an oVerflow flag V for indicating whether or not an overflow occurred when generating the previous processing result. Hence, the values of the condition code flags provide information about the previous processing result. The flags may be set to indicate that a negative number, zero value, carry or overflow did occur, and cleared to indicate otherwise, or vice versa. For examples of the information represented by different combinations of the condition code flags N, Z, C, V, see FIGS. 8 and 10.

FIG. 3A illustrates an example syntax of a conditional compare instruction CCMP according to the present technique. The conditional compare instruction has fields for specifying a test condition, two operands, and a fail condition state. The instruction decoder 14 is responsive to the conditional compare instruction to control the processing circuitry 4 to determine whether or not the current condition state stored in the status register 15 satisfies the test condition (cond) associated with the conditional compare instruction. If the current condition state satisfies the test condition, then the processing circuitry 4 performs a compare operation on the two operands and updates the current condition state based on the processing result (for example, if the compare operation results in a negative value then the condition flag N can be set). If the current condition state at the time of execution of the conditional compare instruction does not satisfy the test condition, then the comparison operation is not performed and the fail condition state value specified by the conditional compare instruction is written to the status register 15 to update the current condition state.

FIG. 3B illustrates an example encoding of the conditional compare instruction of FIG. 3A. In this example, the instruction includes a 4-bit field for specifying the test condition, two 5-bit fields for specifying the operand registers, and a 4-bit field for specifying the fail condition state. It will be appreciated that other numbers of bits may be used for each field if desired. In this example, the 4-bit test condition identifier #0b0000 indicates the EQ condition. When the instruction is executed, then the condition codes are tested to see whether they satisfy the EQ test condition. If the EQ test condition is satisfied, then the values stored in the operand registers (registers R2 and R9 in this example) are compared, and the condition codes are updated based on the result of the comparison. If the EQ test condition is not satisfied then the fail condition state value (#0b0001 in this example) is written to the condition codes NZCV.

In the syntax of FIG. 3A, the conditional compare instruction specifies both of the operands using register specifiers Rn, Rm. The register specifiers Rn, Rm identify registers of the register bank 6 that store the operands to be compared. The operands to be compared may be integer or floating point numbers.

In another example syntax as shown in FIG. 4A, one of the operands #op may be specified as an immediate value within the conditional compare instruction. This can be useful when a variable and a constant are to be compared with one another. FIG. 4B shows an example encoding of an instruction having the syntax shown in FIG. 4A. If the test condition (e.g. LT) is satisfied, then the value stored in the operand register (e.g. R7) is compared with the immediate value (e.g. #19) and the condition codes are updated in dependence on the comparison. If the test condition is not satisfied then the fail condition state value #0b0000 is written to the condition codes NZCV.

When an operand is specified using a register specifier, the instruction decoder 14 can optionally be configured to interpret a particular register specifier value as indicating a zero operand rather than an operand stored in a register. For example, in the FIG. 3 embodiment when the register specifier Rm specifies an all-ones bit value 0b11111 then this could be used to indicate that the operand stored in register Rn should be compared with a zero value by the processing circuitry 4.

In both of the syntaxes of FIGS. 3 and 4, the fail condition state is specified as an immediate value representing the bit value to be written to the condition code flags of the status register 15 if the test condition is failed. For example, using the NZCV condition code flags as shown in FIG. 2, an immediate value representing a fail condition state of 0b0100 can indicate that 0 should be written to the negative, carry and overflow flags N, C, V and 1 should be written to the zero flag Z. In this way, the conditional compare instruction specifies directly the condition state to be adopted if the test condition has failed. This is useful because it enables the conditional compare instruction to be used to set the current condition state to an appropriate value ready for use by a following conditional instruction.

Figure 5:
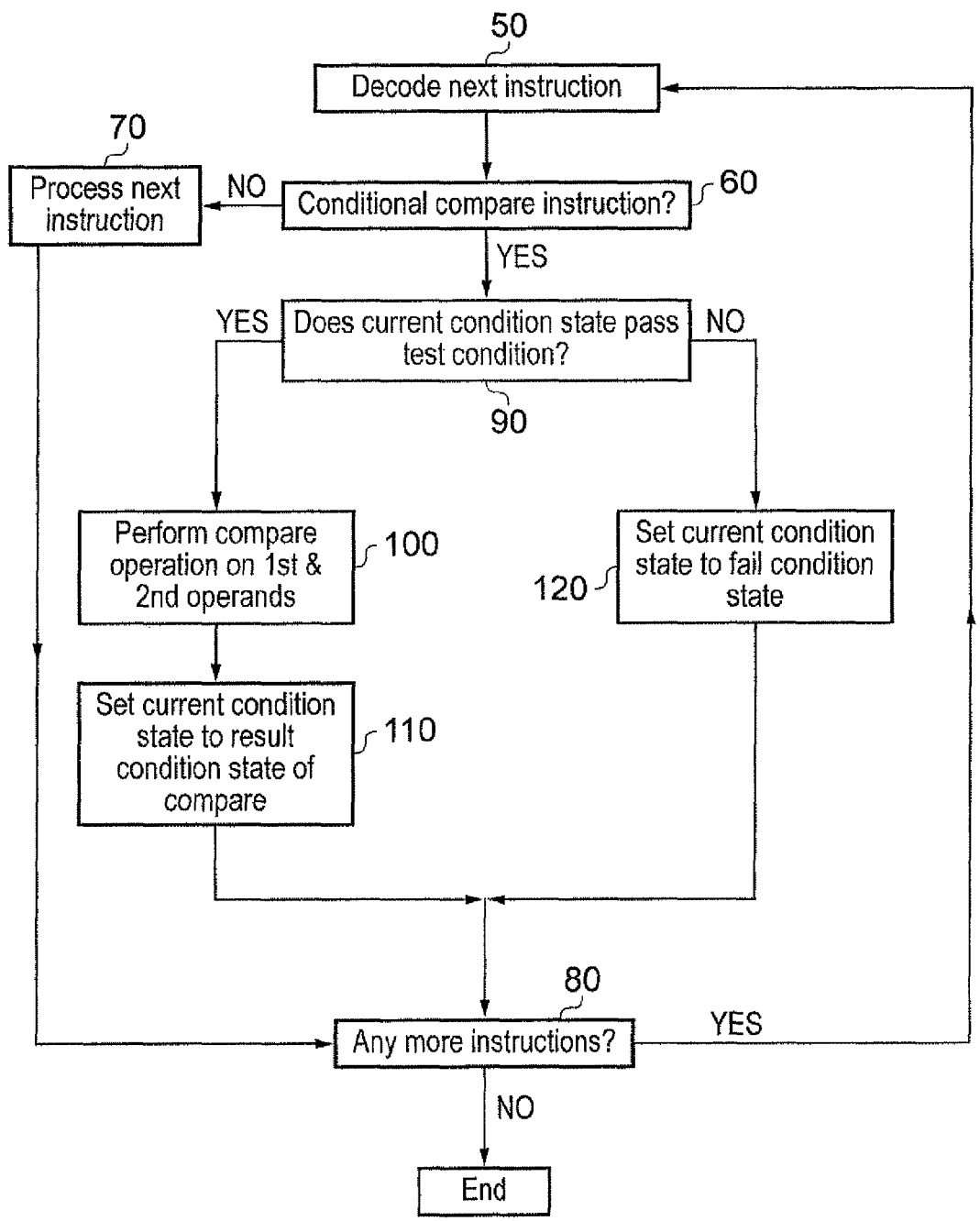
FIG. 5 illustrates a method for processing a conditional compare instruction.

FIG. 5 illustrates a method of data processing using the conditional compare instruction of the present technique. At step 50, the instruction decoder 14 decodes a next instruction of a sequence of instructions. At step 60, the decoder 14 determines whether the next instruction is a conditional compare instruction. If the next instruction is not a conditional compare instruction, then at step 70 the instruction decoder 14 generates control signals corresponding to the next instruction and controls the processing circuitry 4 to perform an operation corresponding to the next instruction. Processing then proceeds to step 80 at which it is determined whether there are any more instructions to be processed. If more instructions are to be processed, then the method returns to step 50, and the next instruction is decoded. If no more instructions are to be processed, then the method ends.

On the other hand, if at step 60 the next instruction is a conditional compare instruction, then the instruction decoder 14 generates control signals for controlling the processing circuitry 4 to perform a conditional compare operation. At step 90, the processing circuitry 4 determines whether or not the current condition state represented by the condition code flags of the status register 15 passes the test condition associated with the conditional compare instruction. If the current condition state passes the test condition, then at step 100, the processing circuitry 4 is controlled to perform a compare operation on the first and second operands. Then at step 110, the status register 15 is updated to set the current condition state to a result condition state generated while performing the compare operation at step 100.

On the other hand, if at step 90 the current condition state did not pass the test condition, then at step 120 the current condition state is set to the fail condition state specified by the conditional compare instruction. For example, the immediate value specified by the conditional compare instruction is written to the condition code flags of the status register 15.

Regardless of whether or not the current condition state passed the test condition at step 90, the method then proceeds to step 80, and it is determined whether there are any more instructions to be processed. If another instruction is to be processed then the method returns again to step 50. Otherwise, the method ends.

FIG. 5 shows that whether or not the current condition state of the conditional compare instruction passes the test condition, the condition code flags representing the current condition state are updated (in contrast to the previous conditional instructions which act as a no-op instruction if the test condition is failed). The updated value of the current condition state depends on whether or not the current condition state passes the test condition. If the current condition state passes the test condition, then the updated condition state is determined based on the result of comparing the first and second operands, while if the current condition state has not passed the test condition, then the updated value is the fail condition state specified by the conditional compare instruction. This kind of instruction is useful because the ability to specify a fail condition state to which the current condition state should be updated if the current condition state does not pass the test condition enables these instructions to be used to represent a string of chained comparison operations testing different kinds of logical relations.

Various types of conditional compare instruction may be provided, each being processed in accordance with steps 90-120 FIG. 5, but using different compare operations at step 100. Examples of these types of conditional compare instructions are illustrated in FIGS. 6A to 6F. FIGS. 6A to 6F illustrate instructions of the form in which the first and second operands are identified using register specifiers, but alternative forms of each of these instructions can also be provided where one of the operands is specified as an immediate value. Also, the syntax of these instructions can be modified if desired to specify the fail condition state as a condition mnemonic rather than as an immediate value #imm as explained below.

FIG. 6A illustrates a conditional compare positive instruction CCMP. If the test condition specified by the conditional compare positive instruction is passed, then the processing circuitry 4 is controlled to subtract the second operand from the first operand and write the result condition state to the condition flags, while if the test condition is failed then the fail condition state #imm specified in the instruction is written to the condition flags. This kind of instruction can be useful for testing whether or not the first operand is greater than, or equal to, the second operand.

FIG. 6B illustrates a conditional compare negative instruction CCMN. If the test condition specified by the instruction is passed by the current condition state, then the first and second operands are added together and the result condition state written to the condition flags, while if the current condition state does not pass the test condition then the fail condition state #imm is written to the condition flags.

This kind of instruction can be useful for testing whether or not the first operand is greater than the value obtained by multiplying the second operand by −1 (since adding the first and second operands is equivalent to subtracting (−1*the second operand) from the first operand).

FIG. 6C illustrates a conditional equivalence test instruction CTEQ. When this type of instruction is executed, then if the test condition specified by the instruction is passed then the processing circuitry 4 is configured to perform an exclusive OR operation on the first and second operands and write the result condition state to the condition flags, while if the test condition is failed then the fail condition state #imm specified by the instruction is written to the condition flags. This type of instruction can be used to test whether or not the first operand is equal to the second operand.

FIG. 6D illustrates a conditional bitwise test instruction CTST. When this type of instruction is executed, then if the test condition is passed then the processing circuitry 4 performs a bitwise AND operation on the first and second operands and writes the result condition state to the condition flags, while if the test condition is failed then the fail condition state #imm is written to the condition flags. This type of instruction can be used to test whether the bits of the first operand corresponding in position to '1' bits within the second operand are all zero or not all zero. A particularly useful case is when the second operand contains exactly one '1' bit, and when the instruction tests whether the corresponding bit of the first operand is '0' or I'.

FIG. 6E illustrates a conditional add with carry instruction CADC. When this instruction is executed, then if the test condition is passed then the processing circuitry 4 is controlled to add the first operand, the second operand and the current value of the carry flag C within the status register 15 and write the result condition state resulting from this addition to the condition flags. On the other hand, if the test condition is failed then the fail condition state #imm is written to the condition flags as for the other types of conditional compare instruction. The add carry operation can be used to represent the second, third or further word of a multi-word addition, with the carry bit indicating whether the previous word of the multi-word addition resulted in a carry.

FIG. 6F illustrates a conditional bitwise OR test instruction CORRT which when executed controls the processing circuitry 4 to perform a bitwise OR of the first and second operands provided the test condition is passed. The result condition state arising from the bitwise OR is written to the condition flags. On the other hand, if the test condition is failed, then the fail condition state #imm is written to the condition flags. Such an instruction can be used to test whether two registers both store zero values. This can be particularly useful for testing whether a double-width data value equals zero. For example, a double-width 128-bit value RnHi/Lo can be stored using two 64-bit registers RnHi and RnLo. The bitwise OR test instruction enables both halves of the double value to be tested against zero using a single instruction, since a bitwise OR of the upper and lower portions of the double-width value will have a zero value only if both portions equal zero. This can be more efficient than comparing each portion of the double-width value against zero individually. Hence, expressions of the form (RnHi/Lo !=0) && (RmHi/Lo==0) can be evaluated efficiently using two instructions:

```
ORRT RnHi, RnLo;         //Z=1 if RnHi/Lo = 0, and Z=0 otherwise)
CORRT NE, RmHi, RmLo,    //Z=1 if (ORRT set Z to 0 AND RmHi/Lo =
#0                       0), //Z=0 otherwise.
```

It will be appreciated that in any particular embodiment the instruction decoder may be responsive to any one or more of these instructions to control the processing circuitry 4 to perform the corresponding type of conditional compare operation. For example, in a particular embodiment the decoder 14 could be configured to be responsive to the types of conditional compare instruction illustrated in FIGS. 6A and 6B, say, but not the other kinds of conditional compare instruction.

A string of conditional compare instructions can be used to represent a chained sequence of comparison operations, where each comparison operation in the sequence is logically combined with the combined result of all previous comparison operations using an AND or OR operation (e.g. the sequence (A<B && C==D)||E>=F). Each comparison operation tests a particular criterion (e.g. in the above example, the first comparison operation tests a criterion of whether A<B, the second comparison operation tests a criterion of whether C=D, and the third comparison operation tests a criterion of whether E≥F). Unlike the previously known conditional instructions, the condition compare instruction of the present technique can be used when the chained comparison operations test more than one kind of criterion.

Figure 7A:
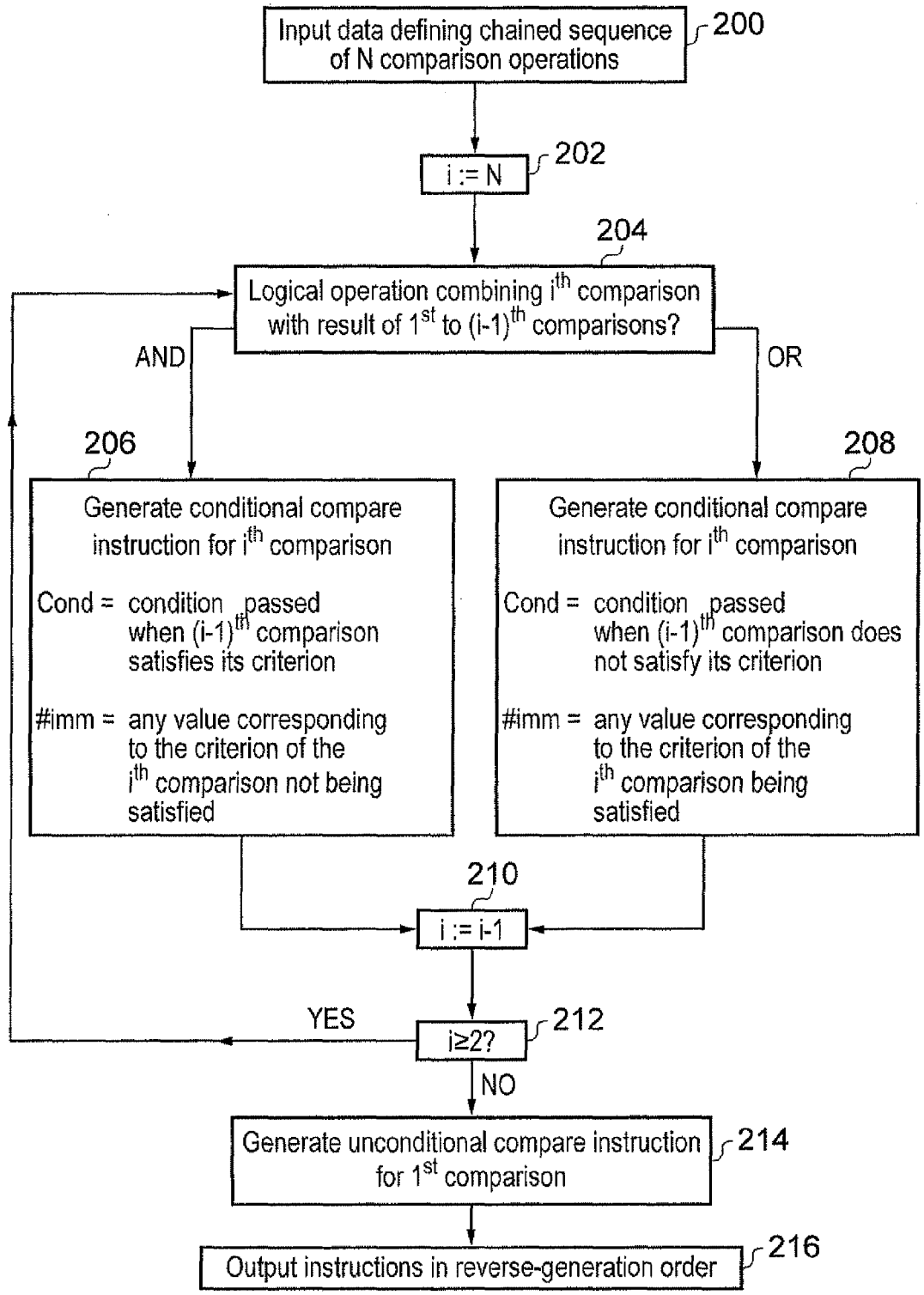
FIGS. 7A and 7B illustrate example methods for generating a sequence of program instructions representing a chained sequence of comparison operations.
Figure 7B:
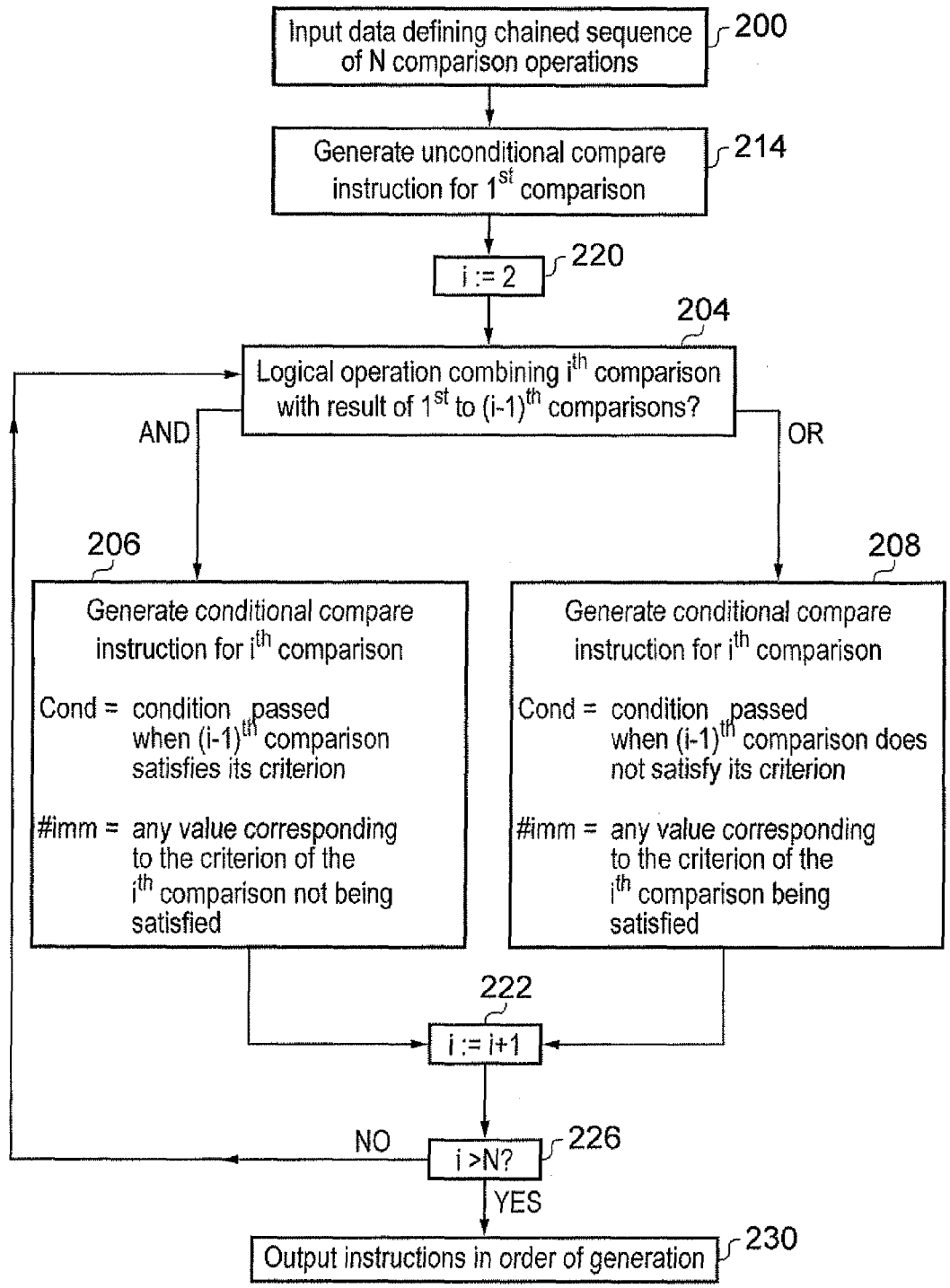

FIGS. 7A and 7B illustrate embodiments of a method for converting a particular chained sequence of comparison operations into a sequence of compare instructions. Such a method can be performed for example by a compiler which receives inputs defining the sequence of comparison operations and generates a corresponding sequence of program instructions.

FIG. 7A illustrates a first embodiment of such a method. At step 200, the data defining the chained sequence of N comparison operations is input (N is any integer greater than 1). At step 202, a count variable i set to be equal to N. At step 204, it is determined whether or not the logical operation that combines the $i^{th}$ comparison of the chained sequence with the combined result of the first to $(i-1)^{th}$ comparisons of the chained sequence is an AND or an OR operation. For example, in the sequence (A<B && C==D)||E>=F, when i=3 the $i^{th}$ comparison of the sequence (E>=F) is chained to the combination of the 1st to $(i-1)^{th}$ comparisons (A<B && C==D) via an OR operation || and when i=2 the $i^{th}$ comparison of the sequence (C==D) is chained to the $(i-1)^{th}$ comparison (A<B) via an AND operation &&.

If at step 204 it is determined that the $i^{th}$ comparison operation and the partial chain of first to $(i-1)^{th}$ comparison operations are linked by an AND operation, then at step 206, a conditional compare instruction is generated for the $i^{th}$ comparison operation, in which the test condition cond is set to a condition which is passed when the $(i-1)^{th}$ comparison satisfies its predetermined criterion, and the fail condition state value is set to any value which corresponds to the criterion of the $i^{th}$ comparison not being satisfied.

For example, when i=2 in the above example, then the condition which is passed when the $(i-1)^{th}$ comparison (A<B) satisfies its predetermined criterion is a condition LT (see FIG. 8—assuming a signed comparison) because this will indicate that A<B. Hence, the test condition for the second conditional compare instruction operation is LT. Also, for i=2 then the criterion of the ith comparison (C==D) is not satisfied when C does not equal D, i.e. the NE state shown in FIG. 8, for which the Z flag is not set. Hence, the fail condition state value of the $i^{th}$ conditional compare instruction can be set to any combination of values which will result in the Z flag being clear (e.g. 0b0000).

On the other hand if at step 204 the logical operation combining the $i^{th}$ comparison operation and the partial chain of first to $(i-1)^{th}$ comparison operations is an OR operation, then at step 208 a conditional compare instruction is generated for the $i^{th}$ comparison operation, in which the test condition is set to be a condition which is passed when the $(i-1)^{th}$ comparison operation does not satisfy its criterion and the fail condition state value is set to any value corresponding to the criterion of the $i^{th}$ comparison being satisfied.

For example, for i=3 in the above example sequence, the condition which is passed when the $(i-1)^{th}$ comparison operation (C==D) does not satisfy its criterion is state NE of FIG. 8, and so the test condition for the third conditional compare operation is set to be NE. Also, for i=3 then the criterion for the $i^{th}$ comparison (E>=F) is satisfied when E is greater or equal than F (e.g. in the GE state for assigned comparison—see FIG. 8). Hence, the fail condition state value can be set to any combination of condition flag values that corresponds to the GE state (e.g., following FIG. 8, bits N and V are the same and all other bits can have any values—e.g. 0b0000).

Regardless of whether the logical operation was an AND or an OR operation, then at step 210 the count variable i is decremented and at step 212 it is determined whether the new count variable i is greater than or equal to 2. If the new count variable i is greater than or equal to 2 then steps 204 to 212 are repeated for the new value of i, so that another conditional compare instruction is generated for another comparison operation. In this way, conditional compare instructions are generated for each of the second to Nth comparison operations of the chained sequence.

If at step 212, i is smaller than 2, then the method proceeds to step 214, where an unconditional compare instruction is generated for the first comparison of the chained sequence. For example, in the above sequence then an unconditional compare instruction can be generated which determines whether A<B and updates the condition code flags according to the comparison result. At step 216, all the generated instructions are output in the reverse order of generation to form the sequence of instructions representing the chained sequence of comparison operations.

FIG. 7B illustrates an alternative embodiment of a method of generating a sequence of instructions corresponding to the comparison operations. The steps of FIG. 7B which are identical to the corresponding steps of FIG. 7A have been labeled using the same reference numerals as in FIG. 7A. FIG. 7B differs from FIG. 7A in that the instructions are generated in the order of the corresponding comparison operations within the chained sequence, rather than in reverse order as in FIG. 7A. The unconditional compare instruction for the first comparison operation of the chain sequence is generated at step 214 of FIG. 7B. The count variable i is then initialized to a value of 2 at step 220. Steps 204 to 208, which are identical to the corresponding steps of FIG. 7A, are then performed for the comparison operation, and repeated while I is successively incremented at step 222 until i becomes greater than N at step 226. This means that conditional compare instructions are generated for the second to Nth comparison operations in the chain. Once i is greater than N, then at step 230 the generated instructions are output in the order of generation at step 230 to form the sequence of program instructions.

As can be seen from FIGS. 7A and 7B, the order in which the unconditional compare instructions for the first comparison operation and the conditional compare instructions for the second to N$^{th}$ comparison operations are generated is not particularly important, as long as a conditional compare instruction is generated for each of the second to N$^{th}$ comparison operations and an unconditional compare instruction generated for the first comparison operation and the generated instructions are output in the correct program order. It will be appreciated by those skilled in the art that generation orders other than those shown in FIGS. 7A and 7B are also possible.

The unconditional compare instruction generated at step 214 of FIGS. 7A and 7B may be an instruction having a different syntax to the conditional instruction. For example, the unconditional compare instruction may have a syntax specifying two operands, so that the instruction decoder generates control signals for controlling the processing circuitry 4 to compare the operands and update the condition code flags NZCV according to the comparison result. The unconditional compare instruction syntax may omit the test condition and fail condition state of the conditional compare instruction syntax shown in FIG. 3, 4 or 6. The AL (always passed) condition state of FIG. 8 may omitted in such an embodiment.

Alternatively, the unconditional compare instruction and conditional compare instruction may have a common syntax, with the unconditional compare instruction being formed from the conditional compare instruction syntax shown in any of FIGS. 3, 4 and 6 by setting the test condition cond to a condition state which is always satisfied regardless of the value of the condition flags. For example, for the unconditional instruction, the test condition cond could be set to be equal to the "always" condition state AL of FIG. 8, so that the instruction always passes its condition codes (in this case, the fail condition state may be set to any value since it will never be needed). Hence the same kind of instruction syntax can be used both as an unconditional compare instruction and a conditional compare instruction depending on the test condition specified for that instruction. This can improve the efficiency of use of instruction encoding space.

FIG. 8 illustrates a table showing different combinations of the condition code flags each representing a particular condition state which is designated by a particular condition suffix (or condition "mnemonic"). For example, the PL state indicates that the previous processing result was either positive or zero, and is designated by the "N" condition flag being clear. Hence, any combination of NZCV bit values 0b0xxx (where x is any of 0 or 1) has the N bit clear and so can indicate the PL state.

The method of FIGS. 7A and 7B is explained in more detail below.

Suppose we have an "if" test that is a "chained" sequence of individual compares, such as:

if (((s==t && u>=0)||a !=b) && c>d)

where we shall for sake of example only assume that s, t and u are signed variables and a, b, c and d are unsigned variables (they can equally well be unsigned variables).

A suitable set of rules for generating a code sequence for such a "chained" sequence is:

1. The result will always be reflected by the suitable conditions for the final individual compare in the "chain".
2. If the chained "sequence" just contains a single individual compare, use an unconditional compare (CMP) instruction on its two operands (see step 214 of FIGS. 7A and 7B). The unconditional compare instruction is defined to produce one of the condition states of FIG. 8 in dependence on the comparison result.
3. Otherwise, the chained sequence consists of a shorter chained sequence either ANDed or ORed with one additional individual compare.
4. If the chained sequence consists of a shorter chained sequence ANDed with one additional compare, then (see step 206 of FIGS. 7A and 7B) produce the instruction sequence for that shorter chained sequence and follow it with:
   CCMP cond, op1, op2, #imm
   where:
     cond is the condition produced by the shorter chained sequence when it is passed;
     op1 and op2 are the two operands for the additional compare; and
     imm is any set of N, Z, C, V condition flag values that correspond to the desired "failed" result from the additional compare.
   This ensures that if the shorter chained sequence produces its "failed" condition, the additional compare will produce its own "failed" condition, and if the shorter chained sequence produced its "passed" condition, the additional compare will produce either its own "failed" result or its own "passed" result depending on the result of the individual test, which is the correct behaviour for ANDing in the additional compare.
5. If the chained sequence consists of a shorter chained sequence ORed with one additional compare (see step 208 of FIGS. 7A and 7B), then produce the instruction sequence for that shorter chained sequence and follow it with:
   CCMP cond, op1, op2, #imm
   where:
     cond is the condition produced by the shorter chained sequence when it is failed;
     op1 and op2 are the two operands for the additional compare; and imm is any set of N, Z, C, V condition flag values that correspond to the desired "passed" result from the additional compare.

This ensures that if the shorter chained sequence produces its "passed" condition, the additional compare will produce its own "passed" condition, and if the shorter chained sequence produced its "failed" condition, the additional compare will produce either its own "failed" result or its own "passed" result depending on the result of the individual test, which is the correct behaviour for ORing in the additional compare.

To illustrate this for the above example of generating a code sequence for (((s==t && u>=0)||a !=b) && >d):

The sequence's final comparison is an unsigned >, so following rule 1 the aim is to produce the HI condition of FIG. 8 if it passes (i.e. is TRUE) and the LS condition of FIG. 8 if it fails (i.e. is FALSE). Hence, the aim is:

```
... as yet undetermined code sequence ...
// Now have HI if (((s == t && u >= 0) || a != b) && c > d)
// is TRUE, LS otherwise
```

The chained sequence (((s==t && u>=0)||a !=b) && c>d) is the shorter chained sequence ((s==t && u>=0)||a !=b) ANDed with the additional compare c>d. Following rule 4 above:

The shorter chained sequence has a != test as its final comparison, so is to produce the NE condition if it passes.

The desired "failed" result of the additional compare is LS=(C==0)|(Z=1).

Pick any value of an NZCV set of flags that satisfies that condition, for example NZCV=0b0000.

And the code sequence can be developed one step to:

```
... as yet undetermined code sequence ...
// Now have NE if ((s == t && u >= 0) || a != b) is TRUE, EQ
// otherwise
CCMP NE, Rc, Rd, #0b0000
// Now have HI if (((s == t && u >= 0) || a != b) && c > d)
// is TRUE, LS otherwise
```

The chained sequence ((s==t && u>=0)||a !=b) is the shorter chained sequence (s==t && u>=0) ORed with the additional compare a !=b. Following rule 5 above:

The shorter chained sequence has a signed >= test as its final comparison, so is to produce the LT condition if it fails.

The desired "passed" result of the additional compare is NE=(Z==0). Pick any value of an NZCV set of flags that satisfies that condition, for example NZCV 0b0000.

And the code sequence can be developed a second step to:

```
... as yet undetermined code sequence ...
// Now have GE if (s == t && u >= 0) is TRUE, LT otherwise
CCMP LT, Ra, Rb, #0b0000
// Now have NE if ((s == t && u >= 0) || a != b) is TRUE, EQ
// otherwise
CCMP NE, Rc, Rd, #0b0000
// Now have HI if (((s == t && u >= 0) || a != b) && c > d)
// is TRUE, LS otherwise
```

The chained sequence (s==t && u>=0) is the shorter chained "sequence" s==t ANDed with the additional compare u>=0. Following rule 4 above:

The shorter chained sequence has an test as its final comparison, so is to produce the EQ condition if it passes.

The desired "failed" result of the additional compare is LT=(N !=V). Pick any value of an NZCV set of flags that satisfies that condition, for example NZCV=0b0001.

And the code sequence can be developed a third step to:

```
... as yet undetermined code sequence ...
// Now have EQ if s == t is TRUE, NE otherwise
CCMP EQ, Ru, #0, #0b0001
// Now have GE if (s == t && u >= 0) is TRUE, LT otherwise
CCMP LT, Ra, Rb, #0b0000
// Now have NE if ((s == t && u >= 0) || a != b) is TRUE, EQ
// otherwise
CCMP NE, Rc, Rd, #0b0000
// Now have HI if (((s == t && u >= 0) || a != b) && c > d)
// is TRUE, LS otherwise
```

Finally, the chained "sequence" s==t is just a single compare, so following rule 2 above, use an unconditional compare instruction for it as described above. This results in the full code sequence:

```
CMP  Rs, Rt
// Now have EQ if s == t is TRUE, NE otherwise
CCMP EQ, Ru, #0, #0b0001
// Now have GE if (s == t && u >= 0) is TRUE, LT otherwise
CCMP LT, Ra, Rb, #0b0000
// Now have NE if ((s == t && u >= 0) || a != b) is TRUE, EQ
// otherwise
CCMP NE, Rc, Rd, #0b0000
// Now have HI if (((s == t && u >= 0) || a != b) && c > d)
// is TRUE, LS otherwise
```

The above technique may be performed by a compiler to convert a desired logical expression into a sequence of program instructions for evaluating the expression. The instructions do not need to determined or generated in any particular order, so long as they are output in the correct program order, so different embodiments of the generation method are possible (see FIGS. 7A and 7B).

In the above examples, the fail condition state is specified by the instruction syntax as an immediate value specifying the combination of bit values to be written to the condition codes in the status register 15.

However, alternatively the syntax can specify the fail condition state as a condition mnemonic (suffix) such as HI, LS, PL, etc as shown in FIG. 8. In this form of the instruction, then the programmer may specify the condition mnemonic desired for the fail condition state and the assembler may convert this into a particular immediate value when assembling the instructions. Hence, from the point of view of the instruction decoder 14 the view of the instructions is the same as in other embodiments, but from a programmer's view the instruction syntax is more intuitive since the meaning of the different condition states can be understood more clearly from the mnemonic than from the condition code values.

In response to a particular condition mnemonic, the assembler may select any fail condition state value that can be written to the condition flags to cause the condition state indicated by the mnemonic to hold. If there are a plurality of possible immediate values corresponding to the same condition, then the assembler may be provided with a rule for selecting a value corresponding to a condition. For example, the assembler could select the largest or smallest available value to ensure that the source code is assembled in the same way every time. For example, in FIG. 8, the largest possible value that satisfies the EQ state is 0b1111 (with the Z bit set).

Thus, in the embodiment in which the fail condition state is specified as a condition mnemonic, the final instruction sequence determined in the above example could appear as follows:

```
CMP Rs, Rt
// Now have EQ if s == t is TRUE, NE otherwise
CCMP EQ, Ru, #0, LT
// Now have GE if (s == t && u >= 0) is TRUE, LT otherwise
CCMP LT, Ra, Rb, NE
// Now have NE if ((s == t && u >= 0) || a != b) is TRUE, EQ
// otherwise
CCMP NE, Rc, Rd, LS
// Now have HI if (((s == t && u >= 0) || a != b) && c > d)
// is TRUE, LS otherwise
```

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

FIG. 10 shows an optional extension to the condition states shown in FIG. 8. In the example of FIG. 10, the processing circuitry 4 can be set to any of a number of different condition states, including a predetermined condition state MZ which is for exclusive use by conditional compare instructions. The processing apparatus cannot be placed in the MZ condition state as a result of normal processing operations. The MZ condition state only arises if a conditional compare instruction which specifies the MZ condition state as its fail condition state fails its test condition. In the example of FIG. 10, the MZ state is represented by the N and Z flags being set, indicating a "minus zero" result. The "minus zero" result cannot arise from normal processing operations, because a normal processing operation will generate a result which is either zero, or negative, but not both zero and negative. FIG. 10 also shows an OK state, which is the inverse of the MZ state. Hence, the OK state is satisfied if either of the N and Z flags is clear.

The MZ state is useful because it allows an instruction to test whether or not a preceding conditional compare instruction passed or failed its test condition. A conditional compare instruction specifying the MZ state as the fail condition state may be executed. A subsequent conditional instruction may then test whether the condition flags are in the MZ state or the OK state. If the condition flags are in the MZ state, then the conditional compare instruction failed its test condition, while if the condition flags are in the OK state, then the conditional compare instruction passed its test condition.

FIG. 11 shows an example of how a conditional compare instruction specifying the MZ state as the fail condition state can be used to constrain a variable X to be within a given range BOT to TOP. If X is within the allowable range BOT to TOP, then X retains its original value. If X is greater than TOP, then X is set equal to TOP, while if X is smaller than BOT, then X is set equal to BOT. Hence, X is constrained so that its maximum possible value is TOP and its minimum possible value is BOT.

FIG. 11 shows an example sequence of instructions for implementing this constraint in the value of X. First, a compare instruction CMP X, TOP is executed to trigger a comparison of the values of X and TOP. The condition flags are then updated based on the result of the comparison. IF X<TOP, then the condition flags will be set to the LT condition state, while if X≥TOP, then the condition flags will be set to the GE condition state.

Next, a conditional compare instruction CCMP LT, X, BOT, MZ is executed. If the LT test condition is passed, then X and BOT are compared and the condition flags updated to one of the LT and GE condition states based on the comparison result. On the other hand, if the LT test condition is failed, then the condition flags are placed in the MZ state.

Next, a conditional select instruction CSEL, MZ, X, TOP, X is executed. If the MZ test condition is passed, then X is selected to have a value of TOP, while otherwise X retains its original value. Finally, a conditional select instruction CSEL LT, X, BOT, X is executed. If the LT test condition is passed, then X is selected to have a value of BOT, while otherwise X retains its original value.

FIG. 11 shows the possible outcomes of X for the cases where X<BOT, BOT≤X<TOP, and TOP≤X. Since the MZ state can only arise as a result of the CCMP instruction failing its test condition (LT), then the occurrence of the MZ state indicates that X≥TOP. If the MZ state did not arise, then the CCMP passed its test condition, and so X<TOP. Whether X is less than BOT, or greater than or equal to BOT, can then be determined from whether the LT or GE condition state occurred following execution of the CCMP instruction.

FIGS. 10 and 11 show an example where the condition state which can only be set by a conditional compare instruction that fails its test condition is the MZ "minus zero" state where the N and Z flags are both set. However, in other embodiments any combination of condition flag values which cannot arise during normal processing may be used instead of the MZ state.

In the example of FIG. 10, the MZ state replaces the "always" AL state shown in FIG. 8, to provide a total of 16 available condition states which can be identified using a 4-bit identifier. It will be appreciated that in other examples the AL state and MZ state may both be provided.

Although illustrative embodiments of the invention have been described in detail herein, with reference to the accompanying drawings, it is to be understood that the invention is not limited to those precise embodiments, and that various changes and modifications can be made by one skilled in the art without parting from the scope of the invention that is defined by the appended claims.

The invention claimed is:

1. A data processing apparatus comprising:
   processing circuitry for processing data;
   an instruction decoder responsive to program instructions to generate control signals for controlling said processing circuitry to process said data;
   a status store for storing a current condition state of said processing circuitry, said current condition state being modifiable during processing of said data;

wherein said program instructions include a conditional compare instruction, and said instruction decoder is responsive to said conditional compare instruction to generate control signals for controlling said processing circuitry to perform a conditional compare operation comprising:
  (i) if said current condition state passes a test condition, then performing a compare operation on a first operand and a second operand and setting said current condition state to a result condition state generated during said compare operation; and
  (ii) if said current condition state fails said test condition, then setting said current condition state to a fail condition state specified by said conditional compare instruction.

2. The data processing apparatus according to claim 1, wherein said status store comprises a status register.

3. The data processing apparatus according to claim 1, wherein said current condition state comprises the value of at least one condition code flag stored within said status store.

4. The data processing apparatus according to claim 1, wherein said conditional compare instruction includes a field for specifying said test condition.

5. The data processing apparatus according to claim 1, wherein said fail condition state is specified as an immediate value by said conditional compare instruction.

6. The data processing apparatus according to claim 5, wherein said immediate value is a programmable value set by the programmer of a program comprising said conditional compare instruction.

7. The data processing apparatus according to claim 5, wherein said immediate value is a programmable value set by a compiler of a program comprising said conditional compare instruction, said compiler selecting said programmable value in dependence on a desired condition that is to be passed by said fail condition state for said conditional compare instruction.

8. The data processing apparatus according to claim 1, wherein said fail condition state is specified as an N-bit fail condition state value, where N is any integer greater than zero, and said current condition state is represented by an N-bit value; and
  said instruction decoder controls said processing circuitry to write said N-bit fail condition state value to said status store when said current condition state fails said test condition.

9. The data processing apparatus according to claim 1, wherein said current condition state is settable to any of a plurality of condition states including a predetermined condition state; and
  said current condition state can only be set to said predetermined condition state if said test condition is failed for a conditional compare instruction specifying said predetermined condition state as said fail condition state.

10. The data processing apparatus according to claim 1, wherein said conditional compare instruction includes first and second operand fields for specifying said first operand and said second operand.

11. The data processing apparatus according to claim 10, wherein at least one of said first and second operand fields specifies a storage location storing said first operand or said second operand.

12. The data processing apparatus according to claim 11, wherein said instruction decoder is responsive to one of said at least one of said first and second operand fields specifying a predetermined combination of bit values to control said processing circuitry to perform said conditional compare operation with a corresponding one of said first and second operands having a value of zero.

13. The data processing apparatus according to claim 10, wherein one of said first and second operand fields specifies an immediate value as said first operand or said second operand.

14. The data processing apparatus according to claim 1, wherein said compare operation comprises any one of:
  (a) subtracting said second operand from said first operand;
  (b) adding said first operand to said second operand;
  (c) performing a bitwise exclusive OR operation on said first operand and said second operand;
  (d) performing a bitwise AND operation on said first operand and said second operand;
  (e) adding said first operand, said second operand, and a carry bit of said status store;
  and
  (f) performing a bitwise OR operation on said first operand and said second operand.

15. A data processing apparatus comprising:
processing means for processing data;
an instruction decoder means for generating control signals in response to program instructions, said control signals being for controlling said processing means to process said data;
status storage means for storing a current condition state of said processing means, said current condition state being modifiable during processing of said data;
wherein said program instructions include a conditional compare instruction, and said instruction decoder means is responsive to said conditional compare instruction to generate control signals for controlling said processing means to perform a conditional compare operation comprising:
  (i) if said current condition state passes a test condition, then performing a compare operation on a first operand and a second operand and setting said current condition state to a result condition state generated during said compare operation; and
  (ii) if said current condition state fails said test condition, then setting said current condition state to a fail condition state specified by said conditional compare instruction.

16. A data processing method comprising the steps of:
in response to program instructions including a conditional compare instruction, generating control signals for controlling processing circuitry to process data;
storing a current condition state of said processing circuitry, said current condition state being modifiable during processing of said data;
in response to said conditional compare instruction, generating control signals for controlling said processing circuitry to perform a conditional compare operation comprising:
  (i) if said current condition state passes a test condition, then performing a compare operation on a first operand and a second operand and setting said current condition state to a result condition state generated during said compare operation; and
  (ii) if said current condition state fails said test condition, then setting said current condition state to a fail condition state specified by said conditional compare instruction.

17. A method of compiling a sequence of program instructions for execution by a data processing apparatus, the sequence of program instructions including an unconditional compare instruction for controlling said data processing apparatus to perform an unconditional compare operation on two operands and set a current condition state of said data processing apparatus to a result condition state generated during said unconditional compare operation, and at least one conditional compare instruction for controlling said data processing apparatus to perform a conditional compare operation comprising: (i) if said current condition state of said data processing apparatus passes a test condition, then performing a compare operation on a first operand and a second operand and setting said current condition state to a result condition state generated during said compare operation; and (ii) if said current condition state fails said test condition, then setting said current condition state to a fail condition state specified by said conditional compare instruction; said method comprising the steps of:

(a) receiving input of data defining a chained sequence of N comparison operations logically combined using one or more AND or OR operations, where N is an integer greater than 1, each of said N comparison operations testing whether respective operands satisfy a respective predetermined criterion;

(b) generating a said unconditional compare instruction corresponding to the first comparison operation of said chained sequence;

(c) for each integer value of i between 2 and N, performing the steps of:

(i) determining whether an $i^{th}$ comparison operation of said chained sequence is logically combined with a result of a partial chained sequence using an AND operation or an OR operation, said partial chained sequence comprising the first to $(i-1)^{th}$ comparison operations of said chained sequence;

(ii) when said $i^{th}$ comparison operation is logically combined with said result of said partial chained sequence using an AND operation, generating a conditional compare instruction corresponding to said $i^{th}$ comparison operation, said conditional compare instruction specifying as said test condition a condition which is passed when said predetermined criterion of said $(i-1)^{th}$ comparison operation is satisfied and specifying as said fail condition state a condition state corresponding to said predetermined criterion of said $i^{th}$ comparison operation not being satisfied;

(iii) when said $i^{th}$ comparison operation is logically combined with said result of said partial chained sequence using an OR operation, generating a conditional compare instruction corresponding to said $i^{th}$ comparison operation, said conditional compare instruction specifying as said test condition a condition which is passed when said predetermined criterion of said $(i-1)^{th}$ comparison operation is not satisfied and specifying as said fail condition state a condition state corresponding to said predetermined criterion of said $i^{th}$ comparison operation being satisfied;

(d) outputting at least said unconditional compare instruction generated in step (b) and (N−1) said conditional compare instructions generated in step (c) as said sequence of program instructions.

18. A virtual machine provided by a computer program executing upon a data processing apparatus, said virtual machine providing an instruction execution environment according to the data processing apparatus as claimed in claim 1.

19. A non-transitory computer storage medium storing a computer program which, when executed by a computer, controls said computer to perform the method of claim 17.

* * * * *